(12) United States Patent
Ross et al.

(10) Patent No.: US 7,085,723 B2
(45) Date of Patent: Aug. 1, 2006

(54) SYSTEM AND METHOD FOR DETERMINING UTTERANCE CONTEXT IN A MULTI-CONTEXT SPEECH APPLICATION

(75) Inventors: Steven I. Ross, S. Hamilton, MA (US); Robert C. Armes, Millbury, MA (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 09/931,505

(22) Filed: Aug. 16, 2001

(65) Prior Publication Data
US 2002/0133354 A1   Sep. 19, 2002

Related U.S. Application Data

(60) Provisional application No. 60/261,372, filed on Jan. 12, 2001.

(51) Int. Cl.
*G10L 21/00* (2006.01)

(52) U.S. Cl. .................. 704/275; 704/270; 704/251

(58) Field of Classification Search ............... 704/275, 704/270, 236, 9, 251, 257, 271; 715/728
See application file for complete search history.

(56) References Cited

U.S. PATENT DOCUMENTS

| | | | |
|---|---|---|---|
| 4,729,096 A | 3/1988 | Larson | |
| 4,736,296 A | 4/1988 | Katayama et al. | |
| 4,914,590 A | 4/1990 | Loatman et al. | |
| 5,101,349 A | 3/1992 | Tokuume et al. | |
| 5,239,617 A | 8/1993 | Gardner et al. | |
| 5,282,265 A | 1/1994 | Rohra Suda et al. | |
| 5,383,121 A | 1/1995 | Letkeman | |
| 5,386,556 A | 1/1995 | Hedin et al. | |
| 5,390,279 A | 2/1995 | Strong | |
| 5,642,519 A | 6/1997 | Martin | |
| 5,677,835 A | 10/1997 | Carbonell et al. | |
| 5,678,052 A | 10/1997 | Brisson | |
| 5,748,841 A | 5/1998 | Morin et al. ............... | 395/2.66 |
| 5,812,977 A * | 9/1998 | Douglas ..................... | 704/275 |
| 5,864,819 A * | 1/1999 | De Armas et al. ......... | 704/275 |
| 5,867,817 A | 2/1999 | Catallo et al. .............. | 704/255 |
| 5,873,064 A * | 2/1999 | De Armas et al. ......... | 704/275 |
| 5,918,222 A | 6/1999 | Fukui et al. | |

(Continued)

FOREIGN PATENT DOCUMENTS

WO    WO 99/05671    2/1999

OTHER PUBLICATIONS

MSDN Online Web Workshop, Active Accessibility Support [online], [retrieved on May, 30, 2001]. Retrieved from the Internet (URL: http://msdn.microsoft.com/workshop.browser/accessibility/overview/overview.asp) (6 pages).

(Continued)

*Primary Examiner*—Wayne Young
*Assistant Examiner*—James S. Wozniak (57) ABSTRACT

A speech center coordinates speech services for a number of speech-enabled applications performing on a computer system. The speech center includes a conversation manager that manages conversations between a user and the speech-enabled applications. The conversation manager includes a context manager that maintains a context list of speech-enabled applications that the user has accessed. If the user speaks an utterance, the context manager determines which speech-enabled application should receive a translation of the utterance from the context list, such as by determining the most recently accessed application.

17 Claims, 5 Drawing Sheets

U.S. PATENT DOCUMENTS

| | | | |
|---|---|---|---|
| 5,937,385 A | 8/1999 | Zadrozny et al. | |
| 5,960,384 A | 9/1999 | Brash | |
| 6,023,669 A | 2/2000 | Suda et al. | |
| 6,044,347 A | 3/2000 | Abella et al. | |
| 6,073,102 A | 6/2000 | Block | |
| 6,138,100 A | 10/2000 | Dutton et al. | |
| 6,192,110 B1 | 2/2001 | Abella et al. | |
| 6,192,339 B1 * | 2/2001 | Cox | 704/270 |
| 6,208,972 B1 * | 3/2001 | Grant et al. | 704/275 |
| 6,233,559 B1 * | 5/2001 | Balakrishnan | 704/275 |
| 6,311,159 B1 * | 10/2001 | Van Tichelen et al. | 704/275 |
| 6,314,402 B1 | 11/2001 | Monaco et al. | |
| 6,334,103 B1 | 12/2001 | Surace et al. | |
| 6,466,654 B1 | 10/2002 | Cooper et al. | |
| 6,519,562 B1 | 2/2003 | Phillips et al. | |
| 6,542,868 B1 | 4/2003 | Badt et al. | |
| 6,604,075 B1 | 8/2003 | Brown et al. | |
| 6,647,363 B1 | 11/2003 | Claassen | |
| 6,721,706 B1 | 4/2004 | Strubbe et al. | |
| 6,728,692 B1 | 4/2004 | Martinka et al. | |
| 6,748,361 B1 | 6/2004 | Comerford et al. | |

OTHER PUBLICATIONS

McGlashan, S., "Towards Multimodal Dialog Management," Jun. 1996, Proceedings of Twente Workshop on Language Technology 11, pp. 1-10.

Spoken Language Dialog Systems, pp. 1-2, Nov. 15, 2000, http://www.mria.edu.au/ltg/slp803D/class/Jones/overview.html (downloaded May 16, 2001).

* cited by examiner

SYSTEM AND METHOD FOR DETERMINING UTTERANCE CONTEXT IN A MULTI-CONTEXT SPEECH APPLICATION

RELATED APPLICATION

This application claims the benefit of U.S. Provisional Application No. 60/261,372, filed Jan. 12, 2001. The entire teachings of the above application are incorporated herein by reference.

BACKGROUND OF THE INVENTION

Speech enabling mechanisms have been developed that allow a user of a computer system to verbally communicate with a computer system. Examples of speech recognition products that convert speech into text strings that can be utilized by software applications on a computer system include the ViaVoice™ product from IBM®, Armonk, N.Y., and NaturallySpeaking Professional from Dragon Systems, Newton, Mass.

In particular a user may communicate through a microphone with a software application that displays output in a window on the display screen of the computer system. For example, a user can communicate with a word processing application to input text that is entered into a document file being presented in a window. Next, the user can select another speech-enabled application with an input device, such as a mouse or keyboard. The user can also select another speech-enabled application by explicitly giving a spoken command to select that application (e.g., "switch to calendar"). Then, the user can provide speech input through the microphone to that application. For example, a user can use the mouse to select the window for a calendar application (or provide an explicit selection command for that application), which then pops to the foreground, obscuring the previously displayed foreground application, such as a word processing application. Then, the user can provide a speech utterance, such as commands or sentence fragments, to be entered to the calendar application. After speaking to the calendar application, the user can use an input device to select the window for another application, such as the word processing application, bring the window forward for that application and then commence providing a speech utterance for that application, and so on.

SUMMARY OF THE INVENTION

The user must thus explicitly select the window for each speech enabled application to be spoken to, and complete the desired task such as entering an appointment into the calendar, before selecting and returning to the previous application to complete some ongoing task, such as a command to enter text into a document. Also, different conventional applications may be speech enabled, but they typically may not share the same speech enabling interfaces, are not aware of each other as speech enabled applications, and cannot make a determination which application should receive a particular speech utterance. If a user speaks out of context, that is, speaks a calendar command to set up an appointment that is received by a word processing application, then the user can experience an unexpected or undesirable result. For example, the word processing application rejects the command outright without any attempt at understanding or enters the literal text of the spoken utterance in the current open document. Meanwhile, the appointment was not entered in the user's calendar. This leads to wasted time and effort, as well as frustration on the user's part.

A speech center configured according to the invention is an independent application which serves as a focal point for all speech communication with the user. The speech center provides speech services for a number of desktop applications, including the task of deciding the target application for a particular utterance provided by the user. This is in contrast to the conventional practice of having individual, independent speech-enabled applications, which leaves the user with a stable of speech-enabled applications, each contending for control of the microphone, and each oblivious to the other.

Such a speech center avoids the time, expense, and footprint of duplicating speech services in multiple applications. The speech center achieves consistent functionality across speech-enabled applications. Dictation has the same capabilities in all applications that support it, for example. As technology improves, a new feature can be incorporated into the speech center once, instead of into each speech-enabled application individually.

The speech center can allow cross-application speech. In one example, a user is working with a spreadsheet application, but then asks about the user's next appointment and obtains the information from a calendar program. In another example, the user asks what is the current stock price for a particular company and obtains the stock price from a stock monitoring service. Furthermore, the user asks whether the user has any new messages and receives an answer supplied by a message or mail application.

Applications do not even have to be running (i.e., currently performing on a computer system). For example, the user makes a request to take a letter, and a word processing application starts up (i.e., is launched by the speech center) if it is not already running.

The speech center can use speech to create an overall environment which melds the capabilities of a number of speech-enabled applications on the user's desktop. These applications do not have to necessarily be applications from any one supplier or vendor. Any application that supports a robust automation user interface can participate.

In one aspect of the present invention, a method and apparatus is provided for determining a speech-enabled application to receive a spoken utterance in a multi-context speech enabled environment. The apparatus includes a context manager and a message handler. The context manager evaluates contexts for speech enabled applications based upon an access characteristic. The message handler receives a representation of a spoken utterance. The context manager receives the representations of the spoken utterance from the message handler and directs the representation of the spoken utterance to a selected speech enabled application based upon the evaluation of the contexts. The context manager, prior to evaluating the contexts, may create the contexts for the speech enabled applications in the speech enabled environment.

In another aspect of the invention, the context manager identifies each context based on a persistent grammar, a foreground grammar, or a background grammar for each speech enabled application. For example, an application that has a window displayed in the foreground (overlapping other windows) is a foreground application, and the context is identified based on a foreground grammar (if one is identified for that application) or based on a persistent grammar (if the application has one persistent grammar that is used for both foreground and background modes).

The context manager may prioritize the contexts based on the access characteristic. The access characteristic may be based on recency of relevant access to the context.

In a further aspect, the context manager uses a grammar to identify which speech enabled application is to receive the representation of the spoken utterance. The grammar may be a Backus Naur Form (BNF). For example, the context manager uses the grammar to determine if a representation of a spoken utterance from a user is acceptable to (can be processed by) a particular speech-enabled application.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
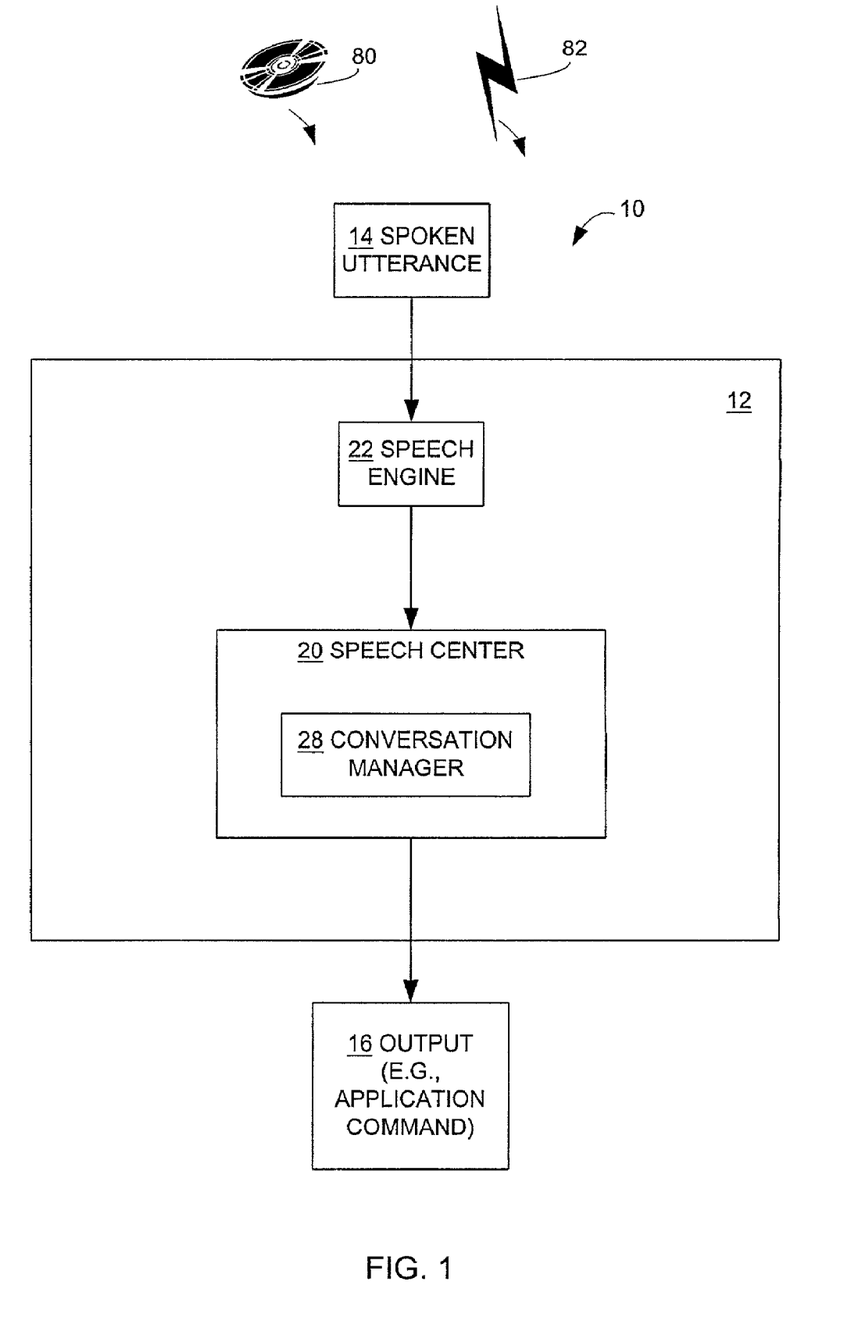
FIG. 1, is an illustration of a preferred embodiment in a computer system.
Figure 2:
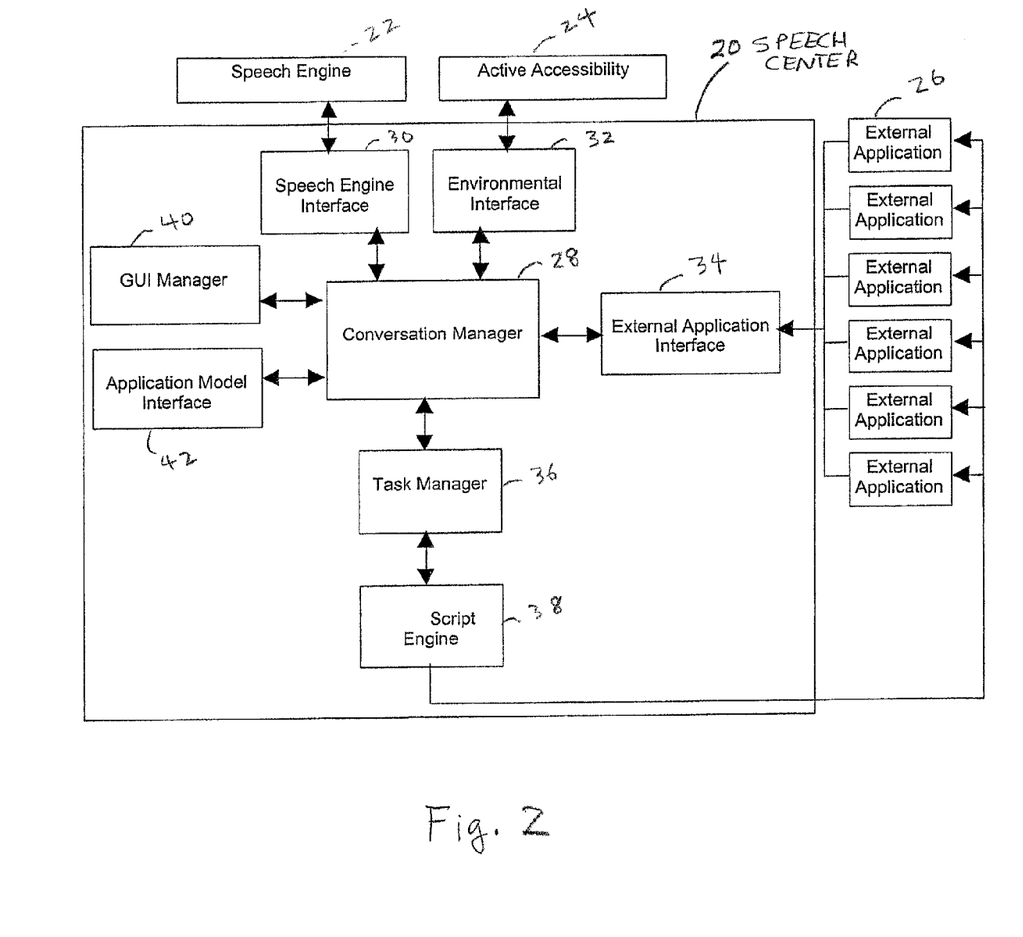
FIG. 2 is a block diagram showing the components of a speech center system configured according to the invention.

FIG. 1 is an illustration of a preferred embodiment in a computer system 10. Generally, the computer system 10 includes a digital processor 12 which hosts and executes a speech center system 20 and speech engine 22 in working memory. The input spoken utterance 14 is a voice command or other speech input from a user of the computer system 10 (e.g., into a microphone connected to the computer system 10). The speech center system 20 includes a conversation manager 28 which determines a context 70 (see FIG. 4) for the spoken utterance 14. The output 16 is a command or other input based on the spoken utterance 14 directed to the speech enabled external application 26 (see. FIG. 2) selected by the conversation manager 28 based on the context 70.

Figure 3:
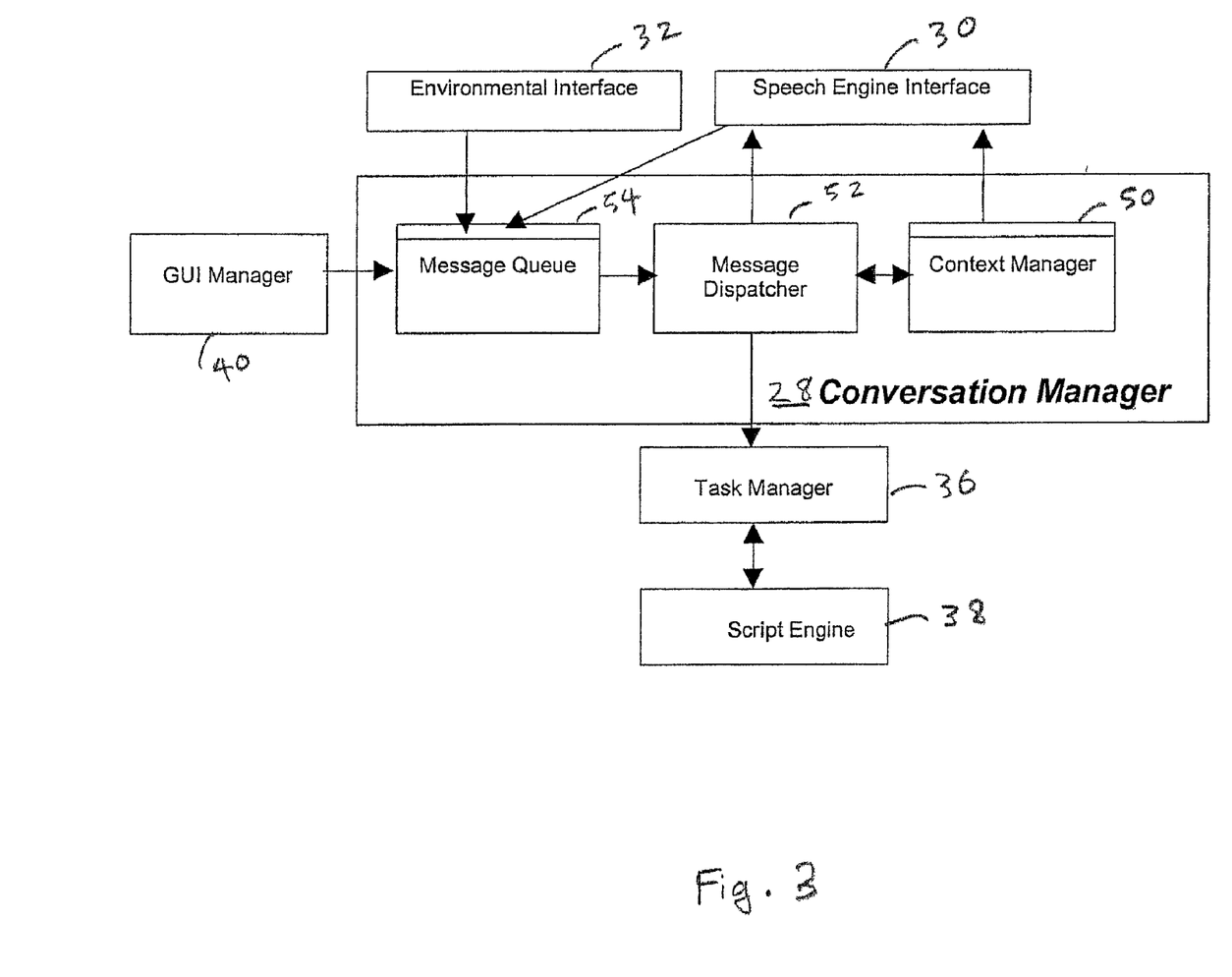
FIG. 3 is a block diagram showing the components of a conversation manager employed in the speech center system of FIG. 2.

In one embodiment, a computer program product 80, including a computer readable medium (e.g., one or more CDROM's, diskettes, tapes, etc.), provides software instructions for the conversation manager 28 or any of its components (see FIG. 3). The computer program product 80 may be installed by any suitable software installation procedure, as is well known in the art. In another embodiment, the software instructions may also be downloaded over a wireless connection. A computer program propagated signal product 82 embodied on a propagated signal on a propagation medium (e.g., a radio wave, an infrared wave, a laser wave, a sound wave, or an electrical wave propagated over the Internet or other network) provides software instructions for the conversation manager 28 or any of its components (see FIG. 3). In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product 80 is a propagation medium that the computer may receive and read, such as by receiving the propagation medium and identifying a propagated signal embodied in the propagation medium, as described above for the computer program propagated signal product 82.

FIG. 2 shows the components of a speech center system 20 configured according to the present invention. FIG. 2 also illustrates external applications 26 that communicate with the speech center 20, a speech engine 22, and active accessability module 24. The speech center 20, speech engine 22, active accessability module 24, and external applications 26, in one aspect of the invention, may be hosted on one computer system 10. In another embodiment, one or more of the external applications 26 may be hosted and executed by a different digital processor 12 than the digital processor 12 that hosts the speech center 20. Generally, the speech center 20 (and its individual components) may be implemented as hardware or software. The speech center 20 includes a conversation manager 28, speech engine interface 30, environmental interface 32, external application interface 34, task manager 36, script engine 38, GUI manager 40, and application module interface 42.

The speech engine interface module 30 encapsulates the details of communicating with the speech engine 22, isolating the speech center 20 from the speech engine 22 specifics. In a preferred embodiment, the speech engine 22 is ViaVoice™ from IBM®.

The environmental interface module 32 enables the speech center 20 to keep in touch with what is happening on the user's computer. Changes in window focus, such as dialogs popping up and being dismissed, and applications 26 launching and exiting, must all be monitored in order to interpret the meaning of voice commands. A preferred embodiment uses Microsoft® Active Accessibility® (MSAA) from Microsoft Corporation, Redmond, Wash., to provide this information, but again flexibility to change this or incorporate additional information sources is desirable.

The script engine 38 enables the speech center 20 to control applications 26 by executing script against them. The script engine 38 provides the following capabilities: The script engine 38 supports cross-application scripting via OLE automation or through imported DLL'S. It is capable of executing arbitrary strings representing well formed script engine 38 statements. This enables the speech center 20 to easily compose calls to respective application operations and invoke them. The script engine 38 environment also allows the definition of new subroutines and functions that combine the primitive functionality provided by applications 26 into actions that more closely correspond to those that a user might talk about. While the speech center 20 is a script-enabled application, this does not mean that the applications 26 that it controls needs to be script-enabled. In the preferred embodiment, the script engine 38 is a LotusScript engine from IBM, and so long as an application 26 provides an OLE automation or DLL interface, it will be controllable by the speech center 20.

The task manager 36 controls script execution through the script engine 38. The task manager 36 provides the capability to proceed with multiple execution requests simultaneously, to queue up additional script commands for busy applications 26, and to track the progress of the execution, informing the clients when execution of a script is in progress or has completed.

The external application interface 34 enables communications from external applications 26 to the speech center 20. For the most part, the speech center 20 can operate without any modifications to the applications 26 it controls, but in some circumstances, it may be desirable to allow the applications 26 to communicate information directly back to the speech center 20. The external application interface 34 is provided to support this kind of push-back of information. This interface 34 allows applications 26 to load custom grammars, or define task specific vocabulary. The external application interface 34 also allows applications 26 to explicitly tap into the speech center 20 for speech recognition and synthesis services.

The application model interface 42 provides models for applications 26 communicating with the speech center 20. The power of the speech center 20 derives from the fact that it has significant knowledge about the applications 26 it controls. Without this knowledge, it would be limited to providing little more than simplistic menu based command and control services. Instead, the speech center 20 has a detailed model of what a user might say to a particular application 26, and how to respond. That knowledge is provided individually on an application 26 by application 26 basis, and is incorporated into the speech center through the application model interface 42.

The GUI manager 40 provides an interface to the speech center 20. Even though the speech center 20 operates primarily through a speech interface, there will still be some cases of graphical user interface interaction with the user. Recognition feedback, dictation correction, and preference setting are all cases where traditional GUI interface elements may be desirable. The GUI manager 40 abstracts the details of exactly how these services are implemented, and provides an abstract interface to the rest of the speech center 20.

The conversation manager 28 is the central component of the speech center 20 that integrates the information from all the other modules 30, 32, 34, 36, 38, 40, 42. In a preferred embodiment, the conversation manager 28 is not a separate component, but is the internals of the speech center 20. Isolated by the outer modules from the speech engine 22 and operating system dependencies, it is abstract and portable. When an utterance is recognized, the conversation manager 28 combines an analysis of the utterance with information on the state of the desktop and remembered context from previous recognitions to determine the intended target of the utterance. The utterance is then translated into the appropriate script engine 38 calls and dispatched to the target application 26. The conversation manager 28 is also responsible for controlling when dictation functionality is active, based on the context determined by the environmental interface 32.

FIG. 3 shows the components of the conversation manager 28 according to the present invention. The conversation manager 28 includes a context manager 50, message dispatcher 52, and message queue 54.

Figure 4:
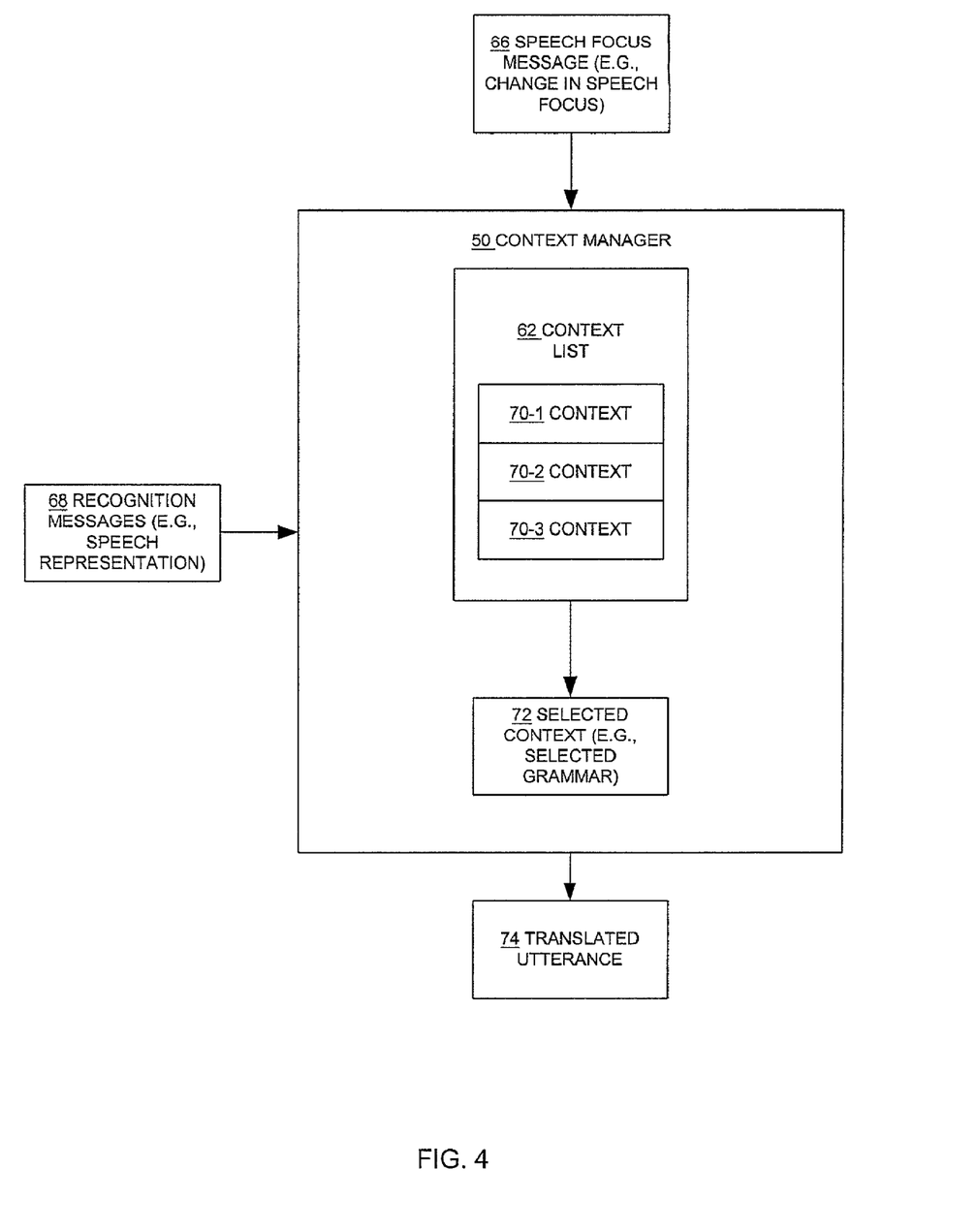
FIG. 4 is a block diagram showing the components of a context manager according to the present invention employed in the conversation manager of FIG. 3.

FIG. 4 shows the components of the context manager 50 according to the present invention. The context manager 50 includes a context list 62. The context list includes contexts 70 (e.g., 70-1, 70-1, 70-3, etc.) for speech-enabled applications 26, which represent the grammars for the applications 26.

In the conversation manager 28 a central message queue 54 receives asynchronous messages from the external interfaces (30 and 32) as well as from internal modules. These messages are then processed and acted upon. The context manager 50 maintains the priority and state of the various grammars in the context list 62 in the system. Speech focus change messages 66 from the environmental interface 32 cause the context manager 50 to reshuffle module priorities and grammar states. Recognition messages 68 from the speech engine interface 30 are tested by the context manager 50 against the active grammars in the context list 62 in priority order. When a successful match is found, the corresponding translation 74 is dispatched to the script engine 38 for execution, and the priority of the matching grammar (i.e., selected context 72) is raised.

The implementation of the speech center 20 makes use of tools, such as translation mechanisms, that have already been developed for dealing with voice. One example of such a voice translation mechanism is provided by copending, commonly assigned U.S. patent application Ser. No. 09/342,937 filed Jun. 29, 1999, entitled "Method and Apparatus for Translation of Common Language Utterance into Computer Application Program Commands," the entire teachings of which are incorporated herein by reference. The goal is to provide multiple-application support relatively quickly. Toward that end, a grammar is defined for each application 26, along with the associated translations for a script engine 38. The grammar is termed a "persistent grammar" for that application 26 if it is the same grammar for the application 26 regardless of whether the application 26 is in either the foreground or the background. An application may also have a "foreground grammar" for when the application 26 is in the foreground, and a different "background grammar" for when the application 26 is in the background. The speech center 20 tracks speech focus in the environmental interface 32 with the aid of MSAA support, mostly tracking window focus. One grammar from each application 26 is active simultaneously, but since there will always be overlap between what the different application grammars will accept, the speech center 20 does not necessarily dispatch a command back to the application 26 whose grammar recognized it. Instead, when an utterance is recognized, it will be tested against each application's grammar to see if the grammar will accept it. The order of testing is based on a dynamic speech focus priority. The first application's grammar which will accept the utterance is then used for translation, and the command dispatched to the corresponding application 26. The speech focus priority is established by maintaining an ordered list of applications (e.g., context list 62). Whenever an application 26 gains window focus, it will move to the head of the list 62. Likewise, whenever an application 26 which is not the top priority application 26 is chosen as the target for a speech command, the application 26 indicated by the selected context 72 will move to the head of the list 62. In this way, the last application 26 that the user touched or talked to will get the first opportunity at interpreting the next user utterance, and the other applications 26 will be ordered in a most-recently-accessed way.

Figure 5:
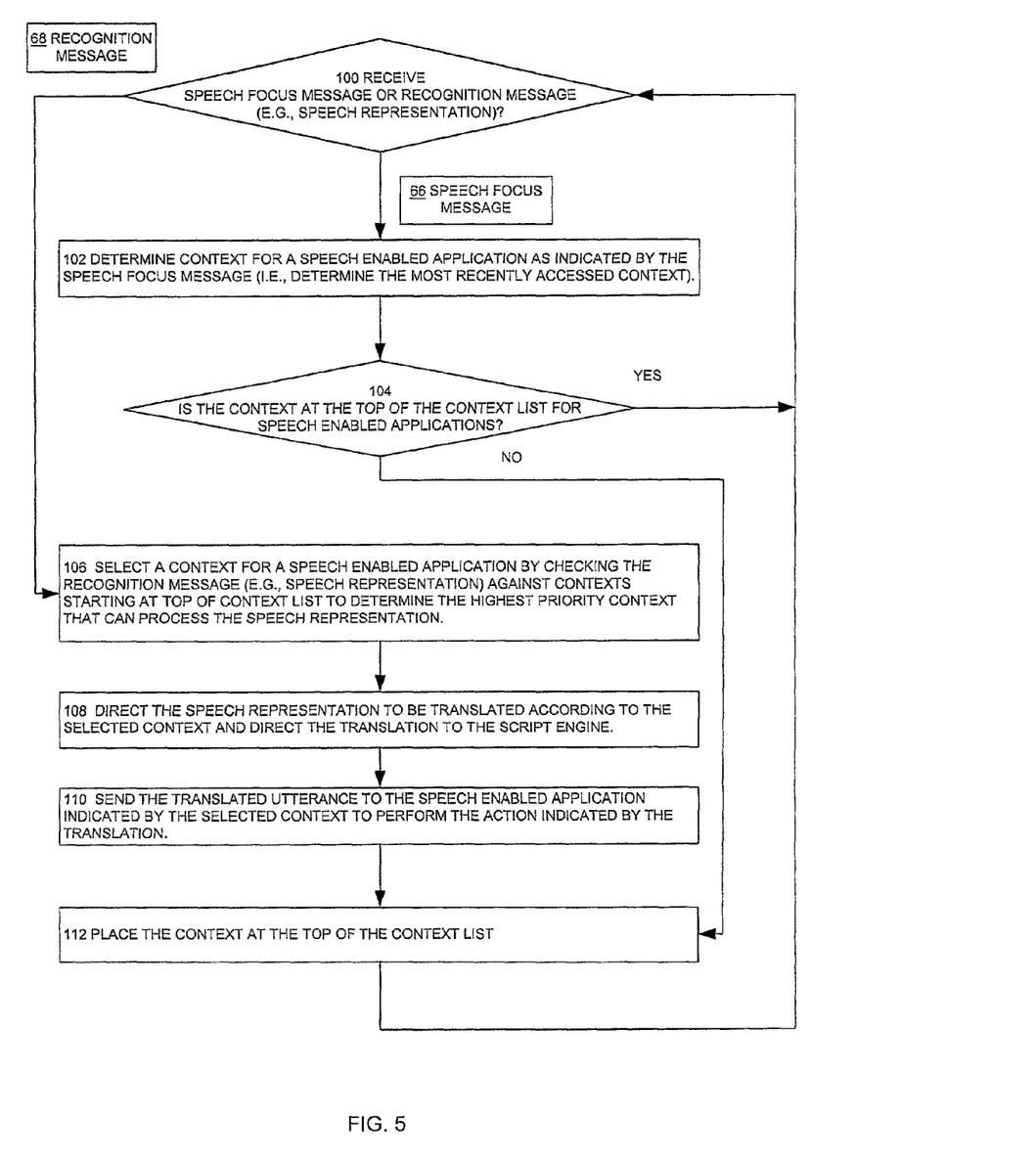
FIG. 5 is a flow chart of a procedure for determining a speech enabled application to receive a representation of a spoken utterance according to the present invention.

In particular, the flow chart in FIG. 5 shows an example of a specific procedure for determining which speech enabled application receives a representation of a spoken utterance for a preferred embodiment of the invention. In step 100, a message handler (e.g., message queue 54 and message dispatcher 52) determines whether a message is a speech focus message 66 or recognition message (speech representation recognized by the speech engine 22) 68. In step 102, if the message is a speech focus message 66, the context manager 50 receives the speech focus message 66 and determines the context 70 for a speech enabled application 26 as indicated by the speech focus message 66. For example, the context manager 50 determines that the speech focus message 66 indicates the most recently accessed speech-enabled application 26. In step 104, the context manager 50 determines whether the context 70 for that application 26 is at the top of the context list 62. If the context 70 for the most recently accessed application 26 is not at the top of the context list 62, then the context manager 50 proceeds to step 112 to place the context 70 at the top of the context list 62.

In step 106, if the message received in step 100 is determined to be a recognition message 68, the context manager 50 receives the recognition message 68 and selects a context 70 for a speech enabled application 26 by checking the speech representation against contexts 70, starting at top of context list 62 to determine the highest priority context 70 that can process the speech representation. For example, the context manager 50 uses the grammar associated with each context 70 to determine if the recognition message 68 is capable of being processed by that grammar In step 108, the context manager 50 directs the speech representation to be translated according to the selected context 72 and directs the translation to the script engine 38. In step 110, the context manager 50 sends the translated utterance 74 to the speech enabled application 26 indicated by the selected context 72 to perform the action indicated by the translated utterance 74. In step 112, the context manager 50 places the selected context 72 at the top of the context list 62.

In a preferred embodiment, each context 70 is implemented as a context object (in C++ or other object oriented programming language) for a specific speech-enabled application 26. The context manager 50 maintains the context list 62 as a queue of context objects. Each context object stores a grammar for that speech-enabled application 26. Furthermore, the context object may indicate one or more files that contain grammars for the same speech enabled application 26. For example, the context object may indicate different files that each store a foreground grammar, a background grammar, and a dialog grammar.

The speech center 20 may also have a speech center context that stores native grammars that can be used in translating a recognition message 68. After the context manager 50 determines the context 70 to which the utterance contained in the recognition message 68 should be directed, the translation of the utterance is first tried using the native grammars stored by the speech center 20. Then a translation is tried using the one or more grammars indicated by the context 70 for that application 26.

The following shows an example of selection between two grammars that serve as the contexts 70 for two applications 26. The following is a sample grammar for an electronic mail application 26:

```
<mail> = do I have any messages |
   open <message> |
   create a message |
   send <message>|
   print <message>.
<message> = the? <nth> message | it | this.
<nth> = first | second | third | fourth | fifth | . . .
```

This grammar allows phrases to be spoken by a user of the electronic mail application 26, such as:
  "Open the first message."
  "Create a message."
  "Send this."
  "Print it."

The following is a sample grammar for a calendar application 26:

```
<appointment> = do I have any appointments |
   open <appointment> |
   create an appointment |
   print <appointment>.
<appointment> = the? <nth> appointment | it | this.
```

This grammar allows phrases to be spoken by a user of the calendar application 26, such as:
  "Open the first appointment."
  "Create an appointment."
  "Print the fourth appointment."
  "Print it."

If both of these grammars were loaded into the context manager 50, (ignoring foreground/background issues in this example, assuming that the grammars are the same for both foreground and background), the speech center system 20 is listening for any of the phrases accepted by either grammar. If the speech center 20 hears a phrase such as "print the first message" or "print the first appointment," the context manager 50 can readily figure out the intended target application 26 for the uttered sentence. Only one grammar will accept the phrase, which thus indicates the selected context 72 for that phrase and that associated application 26 is the one that should be targeted to receive the corresponding command.

If the sentence is "print it" however, both grammars are capable of accepting the utterance. The context manager 50 therefore has to make a choice by referring to the context list 62 of applications in order of recency of access. The context manager 50 tests the utterance against these grammars (indicated by the contexts 70 in the context list 62) in priority order, and passes the commands on to the first application 26 that has a grammar that will accept the phrase.

The context list 62 of applications is reordered every time a recognition is directed to an application 26 other than the highest priority one, or whenever another application 26 gets windows focus (for example, because it was clicked on), as described above. The result is that the system 20 is biased to send the commands to the most recently accessed application 26. For example:

1. The user opens the first message in the electronic mail application 26, which results in the context 70 for the electronic mail application 26 being placed first in the context list 62. If the user says "print it," then the first message is printed.

2. The user then opens the second appointment in the calendar application 26, which results in the context 70 for the calendar application 26 being placed first in the context list 62. If the user says "print this," then the second appointment is printed.

3. The user next opens the third message in the electronic mail application 26, which results in the context 70 for the electronic mail application 26 being placed first in the context list 62.

4. The user then uses the mouse to click on the fourth appointment displayed in a window for the calendar application 26. As a result, the context 70 for the calendar application 26 supersedes the context 70 for the electronic mail application 26 in the context list 62. If the user says "print it," then the fourth appointment is printed.

Thus, the context manager 50 resolves the ambiguous phrase (e.g., "print this" or "print it") by looking in the context list 62 to determine the top priority context 70. Then, assuming that the grammar for the top priority context 70 can process (i.e., recognize) the phrase, the context manager 50 directs a translation of the phrase to the application 26 indicated by the top priority context 70.

In a preferred embodiment, the grammar used for each speech-enabled application 26 may be a Backus Naur Form (BNF) grammar as shown above. In other embodiments, context 70 may include another type of grammar, lists of keywords or phrases, hashed lists of words, or other suitable approaches to allow identification of a phrase as acceptable to a speech-enabled application 26.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining a speech-enabled application to receive a spoken utterance in a multi-context speech enabled environment comprising the computer implemented steps of:
   evaluating a plurality of contexts for speech enabled applications and prioritizing the contexts based upon a recency of relevant access characteristic, said evaluating being based upon different grammars maintained for each speech enabled application comprising persistent, foreground, and background grammars, and said evaluating being applied to speech enabled applications whether the application is running or not;
   receiving a representation of a spoken utterance, the spoken utterance including a command that is able to be associated with multiple applications, any subset of which may or may not be running; and
   directing the representation of the spoken utterance to a selected speech enabled application based upon results of the step of evaluating the contexts, wherein the command is applied to the selected speech enabled application including launching the selected speech enabled application as needed and performing function of the command.

2. The method of claim 1, further comprising the step, prior to evaluating the contexts, of creating the contexts for the speech enabled applications in the speech enabled environment.

3. The method of claim 1 further comprising the step of identifying each context based on a persistent grammar, a foreground grammar, or a background grammar for each speech enabled application.

4. The method of claim 1, wherein the step of directing the representation of the spoken utterance comprises using a grammar to identify and select a context of the selected speech enabled application.

5. The method of claim 4, wherein the grammar is a Backus Naur Form grammar.

6. Computer apparatus for determining a speech-enabled application to receive a spoken utterance in a multi-context speech enabled environment, comprising:
   a context manager for evaluating a plurality of contexts for speech enabled applications and prioritizing the contexts based upon a recency of relevant access characteristic, said context manager evaluating a context based on distinct grammars maintained for each speech enabled application comprising persistent, foreground, and background grammars, and said context manager evaluating each speech enabled application whether the application is running or not; and
   a message handler for receiving a representation of a spoken utterance, the spoken utterance including a command that is able to be associated with multiple applications, any subset of which may or may not be running;
   the context manager receiving the representation of the spoken utterance from the message handler and directing the representation of the spoken utterance to a selected speech enabled application based upon the evaluating of the contexts, wherein the command is applied to the selected speech enabled application including launching the selected speech enabled application as needed and performing function of the command.

7. The apparatus of claim 6, wherein the context manager, prior to evaluating the contexts, creates the contexts for the speech enabled applications in the speech enabled environment.

8. The apparatus of claim 6, wherein the context manager identifies each context based on a persistent grammar, a foreground grammar, or a background grammar for each speech enabled application.

9. The apparatus of claim 6, wherein the context manager uses a grammar to identify the selected speech enabled application.

10. The apparatus of claim 9, wherein the grammar is a Backus Naur Form grammar.

11. A computer program product comprising:
    a computer usable medium for determining a speech-enabled application to receive a spoken utterance in a multi-context speech enabled environment; and
    a set of computer program instructions embodied on the computer useable medium, including instructions to:
    evaluate contexts for speech enabled applications and prioritize the contexts based upon a recency of relevant access characteristic, regardless of the speech enabled applications' running state, said evaluating being based upon distinct grammars maintained for each speech enabled application comprising persistent, foreground, and background grammars;
    receive a representation of a spoken utterance, the spoken utterance including a command that is able to be associated with multiple applications, any subset of which may or may not be running; and
    direct the representation of the spoken utterance to a selected speech enabled application based upon the evaluation of the contexts, wherein the command is applied to the selected speech enabled application including launching the selected speech enabled application as needed and performing function of the command.

12. The computer program product of claim 11, wherein the set of computer instructions comprises further instructions, prior to evaluating the contexts, to create the contexts for the speech enabled applications in the speech enabled environment.

13. The computer program product of claim 11, wherein the set of computer instructions comprises further instructions to identify each context based on a persistent grammar, a foreground grammar, or a background grammar for each speech enabled application.

14. The computer program product of claim 11, wherein the set of computer instructions comprises further instructions to use a grammar to identify the selected speech enabled application.

15. The computer program product of claim 14, wherein the grammar is a Backus Naur Form grammar.

16. A computer implemented method for determining a speech-enabled application to receive a spoken utterance in a multi-context speech enabled environment comprising the steps of:

evaluating a plurality of contexts for speech enabled applications and prioritizing the contexts based upon a recency of relevant access characteristic, said evaluating being based upon distinct grammars maintained for each speech enabled application comprising persistent, foreground, and background grammars;

receiving a representation of a spoken utterance, the spoken utterance including a command that is able to be associated with multiple approaches; and directing the representation of the spoken utterance to a selected speech enabled application based upon results of the step of evaluating the contexts, wherein the command is applied to the selected speech enabled application including launching the selected speech enabled application as needed and performing function of the command.

17. A method as claimed in claim 16 wherein said directing is biased to the most recently accessed application.

* * * * *